(12) United States Patent  (10) Patent No.: US 7,887,451 B2
Baumann  (45) Date of Patent: Feb. 15, 2011

(54) INFINITELY VARIABLE TRANSMISSION, USE THEREOF, AND METHOD FOR THE OPERATION THEREOF

(76) Inventor: Albrecht Baumann, Siedlung Mehlen 3, 97956 Weinkheim (DE)

( * ) Notice: Subject to any disclaimer, the term of this patent is extended or adjusted under 35 U.S.C. 154(b) by 721 days.

(21) Appl. No.: 11/597,731

(22) PCT Filed: May 30, 2005

(86) PCT No.: PCT/EP2005/005809

§ 371 (c)(1), (2), (4) Date: Aug. 27, 2007

(87) PCT Pub. No.: WO2005/116485

PCT Pub. Date: Aug. 12, 2005

(65) Prior Publication Data

US 2008/0132372 A1  Jun. 5, 2008

(30) Foreign Application Priority Data

May 28, 2004  (EP)  ................................. 04012703

(51) Int. Cl.
*F16H 9/26*  (2006.01)
(52) U.S. Cl. ...................................... 475/198; 475/182
(58) Field of Classification Search ................ 475/182, 475/198, 269; 474/47–57, 115
See application file for complete search history.

(56) References Cited

U.S. PATENT DOCUMENTS

| 776,940 | A | * | 12/1904 | Reed | ........................... 474/53 |
|---|---|---|---|---|---|
| 3,374,691 | A | | 3/1968 | Schottel | |
| 3,800,613 | A | * | 4/1974 | Clark | ........................... 474/54 |
| 3,913,410 | A | | 10/1975 | Ackerman | |
| 4,961,719 | A | * | 10/1990 | Wildermuth | .................. 474/50 |
| 5,360,380 | A | * | 11/1994 | Nottle | ......................... 475/182 |

FOREIGN PATENT DOCUMENTS

| DE | 2412664 | 10/1974 |
|---|---|---|
| DE | 3510663 | 7/1986 |
| WO | WO 98/11364 | 3/1998 |

\* cited by examiner

*Primary Examiner*—David D Le
*Assistant Examiner*—Justin Holmes
(74) *Attorney, Agent, or Firm*—Pandiscio & Pandiscio

(57) ABSTRACT

The invention relates to an infinitely variable transmission comprising a support body, peripheral gears mounted on the support body or on elements that are coupled thereto such that the rotating shafts thereof are oriented parallel to each other. The distances between the rotational shafts of the peripheral gears can be adjusted to always be located on the outer surface of an (imaginary) cylinder; at least one row of elements which surround the peripheral gears and with which at least one of the peripheral gears engages; a rotational body, preferably coaxial to the axis of rotation of the (imaginary) cylinder, whose rotary movement is coupled to the rotary movement of the peripheral gears. The rotational coupling between the peripheral gears and the (central) rotational body is effected by means of one or more differentials, so that an asynchronous rotation of the peripheral gears is possible.

12 Claims, 3 Drawing Sheets

INFINITELY VARIABLE TRANSMISSION, USE THEREOF, AND METHOD FOR THE OPERATION THEREOF

BACKGROUND OF THE INVENTION

1. Field of the Invention

The invention relates to an infinitely variable transmission comprising a support body, at least two peripheral gears which are mounted on the support body or on elements that are mechanically coupled thereto in such a way that the rotating shafts thereof are oriented parallel to each other. The distances between the rotational shafts of the peripheral gears can be adjusted so as to always be located on the outer surface of an (imaginary) cylinder. Said transmission further comprises at least one row of elements which surround the peripheral gears on the outside and with which at least one of the gears engages, and a rotational body, preferably coaxial to the axis of rotation of the (imaginary) cylinder, whose rotary movement is coupled to the rotary movement of the peripheral gears; furthermore to a preferred application of such a transmission and an operating method for the same.

2. Description of the Prior Art

Mechanical infinitely variable transmissions are known, in particular with a level friction ring which surrounds two pairs of bevel gears whose tips are inclined towards each other and which are adjustable in an axial direction with respect to each other. The distances between the two pairs of bevel gears are adjusted in opposite directions for the two pairs, so that the friction ring is always frictionally coupled to the two pairs of bevel gears, but finds different circumferences there. Such a transmission is principally infinitely variable, but it is not possible to transmit forces of all magnitudes with them, because the frictional connection tends to slip.

For this reason, attempts have already been made to work with a positive connection-type coupling. For example WO 98/11364 proposes an open chain, the two ends of which are fixed. On a disk-shaped support there are at least two radially adjustable gears which engage with the fixed chain when the disk-shaped support rotates. The peripheral gears then begin to rotate, and this rotation is transmitted to a central shaft by means of drive shafts. The chain surrounds the axle of the disk-shaped support, approximately along a semicircle. Of at least two gears, at least one therefore engages with the chain, in the transitional range both engage to ensure that no slip is possible. Since the at least two gears, via the drive shafts, and the central axle are coupled to each other, they always rotate at the same speed. However, this causes problems with the chain when several gears engage simultaneously, namely during the adjustment of the radial distance of these gears from the rotating shaft. Since they are not capable of rotating relatively to each other, the distance between their teeth is reduced or increased, and the chain engaged there must break.

With respect to this disadvantage, the lesson drawn from DE 35 01 663 does not lead to any improvement. In this attempt to create an infinitely variable transmission with a positive engagement, a gear wheel with a variably effective radius is used; this can be engaged with a chain. The gear wheel is embodied as a disk-shaped support with several eccentric gears which are radially adjustable in relation to its rotating shaft, in particular by means of levers that can be swivelled in and out. Each of the eccentric gears is freely rotatably mounted in one direction of rotation, but is not freely rotatable in the opposite direction of rotation. This gear wheel is coupled in a rotationally fixed manner to another gear wheel by the chain, whereby the chain can be tensioned by a mechanical system regardless of the effective radius of the gear wheel. A reciprocal relative rotation is possible with the gear wheels known from this example, but only in one direction of rotation. This is why all gears except one must be swivelled against the direction of power transmission if the effective radius is to be adjusted, and so they cannot transmit any power. This means that the entire power has to be transmitted via one single gear. Each individual gear must therefore be designed to transmit the maximum power. Moreover, no braking effect is possible with the above-mentioned transmission, and thus no reversal of the direction of rotation.

SUMMARY OF THE INVENTION

This leads to the problem initiating the invention of designing a mechanical, infinitely variable transmission with positive engagement in such a way that several gears mounted eccentrically to a symmetrical axis should engage simultaneously with a chain or the like and should be in a position to transmit power, the distance between said gears and the symmetrical axis being adjustable without their frictional connection to a support for the peripheral gears or a common (output) shaft of the transmission coupled with these having to be interrupted.

The solution to this problem is that the peripheral gears are coupled to each other and/or to the (central) rotational body without a freewheel by means of a compensating or differential gear unit, so that asynchronous rotation of the peripheral gears is possible without the frictional connection being interrupted.

This allows several or even all peripheral gears to remain engaged with the chain, on the one hand, and with each other or with a (central) rotational body on the other hand, that is, to contribute to the power transmission, while an adjustment of the gear transmission ratio is carried out. This means that the chain can surround the support body by more than 180°, and that all gears can constantly transmit an approximately equal share of the total power, so that the individual gears and their bearings or adjustment mechanisms only have to be designed for a reduced torque. This is effected by the compensating or distribution transmission in accordance with the invention, said transmission simultaneously guaranteeing approximately constant power transmission, but allowing relative rotations of the individual gears with respect to each other. This follows from the fact that all peripheral gears are adjusted uniformly, so that the differential speeds between neighbouring gears must also be equal.

It has proved to be favourable that the body supporting the peripheral gears has a point-symmetric structure. This means that for example and arm or an adjusting mechanism is assigned to each of the n peripheral gears, and a rotation of 360°/n leads to an identical arrangement.

It is within the framework of the invention that devices are provided for on the support body to adjust the distance between the peripheral gears themselves or between the peripheral gears and the central axis of an (imaginary) cylinder. This allows the transmission ratio of the gear unit to be adjusted.

Guides running preferably radially with respect to a central axis of an (imaginary) cylinder represent a first option for realising radial adjustment, whereby each of the bodies guided on such a guide contains the bearing for one peripheral gear each. In this case, radial adjustment can be effected by means of radial spindles, for example.

On the other hand, the distance adjustment devices can have levers which can be swivelled around decentral shafts, the bearing for one peripheral gear each being located on said levers. In the event of adjustment, the radial movement is always overlaid by a tangential movement in such a case; however, if the levers are all adjusted synchronously, they effect tangential movements symmetrical to the common shaft, and the purely radial component remains as the relative movement.

For the above-mentioned reason, among other things, the adjustment mechanisms must be coupled to each other, so that the distance adjustment of all peripheral gears is effected uniformly. Then the forces to be transmitted are also always approximately equally great, and this standard load case can accordingly be expected when designing the transmission, whereby each gear must only transmit a fraction of approximately 1/n of the total force.

Synchronous or uniform adjustment of the intercoupled gears is effected by means of a common control element, which acts equally on all adjustment mechanisms. This can be a (toothed) wheel, which is coupled to all adjusting spindles or adjusting levers and which can be influenced preferably by an actuation device which is accessible from the outside.

If at least one row of tooth-engaging elements surrounding the peripheral gears on the outside is flexible and/or adjustable, it is possible to engage with at least one peripheral gear, regardless of its current distance setting. This engagement is ensured if one row of tooth-engaging elements surrounding the peripheral gears on the outside is also pretensioned in the direction of the peripheral gears.

The above design requirements can be met at little expense if at least one row of tooth-engaging elements surrounding the peripheral gears on the outside is formed by a chain whose links engage with the teeth of at least one of the peripheral gears, and which is flexible and is consequently in a position to adapt to the different radial distances between the peripheral gears.

Depending on the structure of the transmission with a fixed or revolving chain, the latter may have a tensioning element or may be coupled to such an element which generates tensile stress between the links of the chain and accordingly pulls these towards the peripheral gears. A closed chain could surround the driven shaft; in such a case the distance to a driven gear could be altered with the purpose of tensioning the chain, and/or a coupling element influencing the synchronous adjustment of the peripheral gears could be pretensioned by a spring element in such a way that the gears are pushed outwards. It is also conceivable to couple two transmission units in accordance with the invention to each other using the same surrounding chain and then to adjust these transmission units in opposite directions to each other so that the distance between the shafts of the peripheral gears is increased in one transmission unit and simultaneously reduced to the same extent in the other, so that the chain always remains tensioned.

This invention-related thought can be further developed to the extent that the link section of the chain is not closed or is only closed by means of a tensioning element. This case preferably refers to a fixed chain, the ends of which are located outside the engaging range of the peripheral gears, so that one or more tensioning elements, for example tensioning springs, can be mounted there.

A pivot bearing located between the support body and the (central) rotational body allows a relative rotation between these bodies, whereby the coupling can be influenced by the adjustable gears. These bodies can then serve as input and output shafts of the transmission according to the invention.

Furthermore, the invention provides for one or more differentials being located on the (central) rotational body, in particular on a central rotating shaft. All rotary movements of the peripheral gears are brought together here in a star shape, so that the differential gear can be implemented in a very small space.

In order to couple two or more gears with each other, several differentials or differential units are arranged one after the other in the direction of the axis of rotation of the (central) rotational body and coupled to each other. Each gear is preferably coupled to one or two other and/or to a central rotating shaft in such a way that its rotary movement influences the others or is influenced by the others. This ensures that no idle running, which could lead to undefined rotary speeds of a gear wheel which is not engaged with the chain, can occur. This ensures that the transmission is really infinitely variable, that is, fully independent of a random intermediate position of the gear, a synchronous re-engagement of a peripheral gear with the chain can be effected.

It is within the framework of the invention that the (central) rotational body, in particular a central rotating shaft, is rotatably coupled to an input or output shaft or the housing of the infinitely variable transmission. The uniform rotary movement originating from the combined effect of the individual rotary movements of the gears can be assigned to each of the above three connecting elements of the transmission in accordance with the invention.

A planetary gear is highly advantageously located between the support body and/or the (central) rotational body, on the one hand, and the input or output shaft or the housing of the infinitely variable transmission on the other hand. An upstream or downstream planetary gear allows an adjustment of gear speed conditions to certain applications; for example synchronous operation, in the course of which internal gear movements and thus internal friction are minimised, can be implemented at maximum speed.

A preferred version of the transmission consists in equipping the support body with a rotating shaft or a ring gear which is rotatably coupled to an input or output shaft or the housing of the infinitely variable transmission.

Furthermore it is also possible to couple or to integrate the ring gear of a planetary gear rotatably with the support body or the (central) rotational shaft, while the sun wheel of the planetary gear is preferably rotatably coupled or integrated with the other respective element (support body or (central) rotational shaft). A differential speed is then at the disposal of the planetary gear support. This can be picked up at the transmission if the planetary gear support of the planetary gear is rotatably coupled to the input or output shaft or the housing of the infinitely variable transmission.

Preferred applications of the infinitely variable transmission according to the invention can be found in passenger cars and/or trucks, agricultural implements and/or vehicles, construction engines and/or vehicles, conveying machines or vehicles, elevators, motorbikes and bicycles etc. In these applications it is a great advantage that far greater forces can be transmitted with the transmission according to the invention than has been the case so far, because several gears are always involved approximately uniformly in the transmission of the power, preferably always at least (n-1), where n is the number of all peripheral gears.

A process according to the invention for operating the infinitely variable transmission described above is characterised in that at least one end of a row of tooth-engaging elements engaging with the peripheral gears is coupled to the chassis of a vehicle or the base of a machine, the input shaft of the infinitely variable transmission is coupled to the support body or the (central) rotational shaft, the output shaft of the infinitely variable transmission is coupled to the other respective element (support body or (central) rotational shaft), and a control element coupled with the distance-adjusting mechanism of one or several peripheral gears is influenced manually or with the aid of an electronic controller in order to adjust the desired transmission ratio. This permits the implementation of an infinitely variable transmission ratio for transmitting very large torques in a very small space, without slip, with it being possible to adjust the transmission ratio under full load, and, even when the direction of rotation of the output shaft is reversed, using suitable gears, for example by means of a downstream planetary gear. This allows, among other things, the implementation of a traction machine whose engine speed can always be kept constant, while travelling speed and direction are defined solely by means of the transmission according to the invention. A clutch is not required.

Further features, details, advantages and effects on the basis of the invention can be seen from the following description of a preferred embodiment of the invention and with the help of the drawing. Here,

DESCRIPTION OF THE PREFERRED EMBODIMENTS

Figure 1:
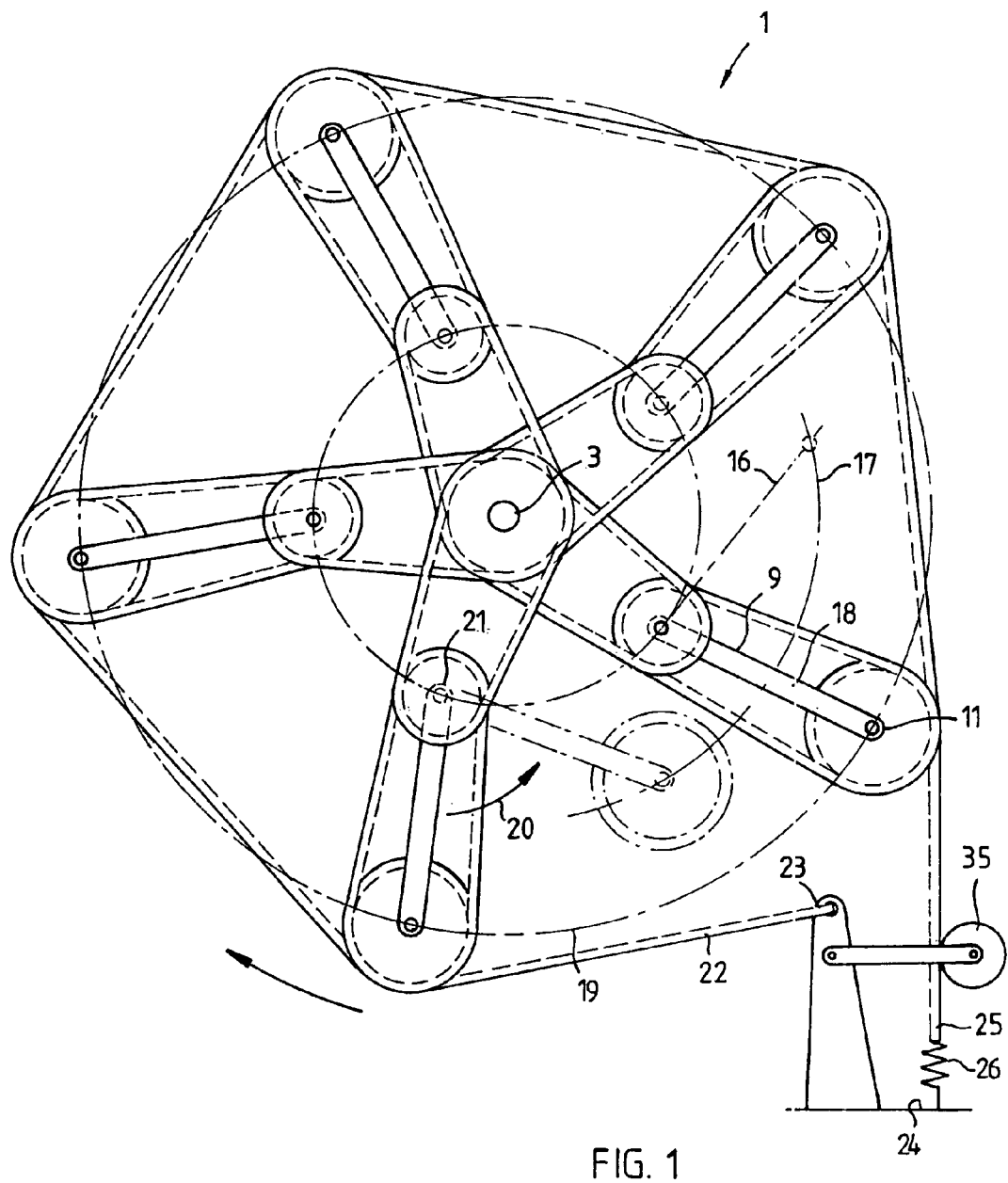
FIG. 1 shows a front view of the transmission according to the invention.
Figure 2:
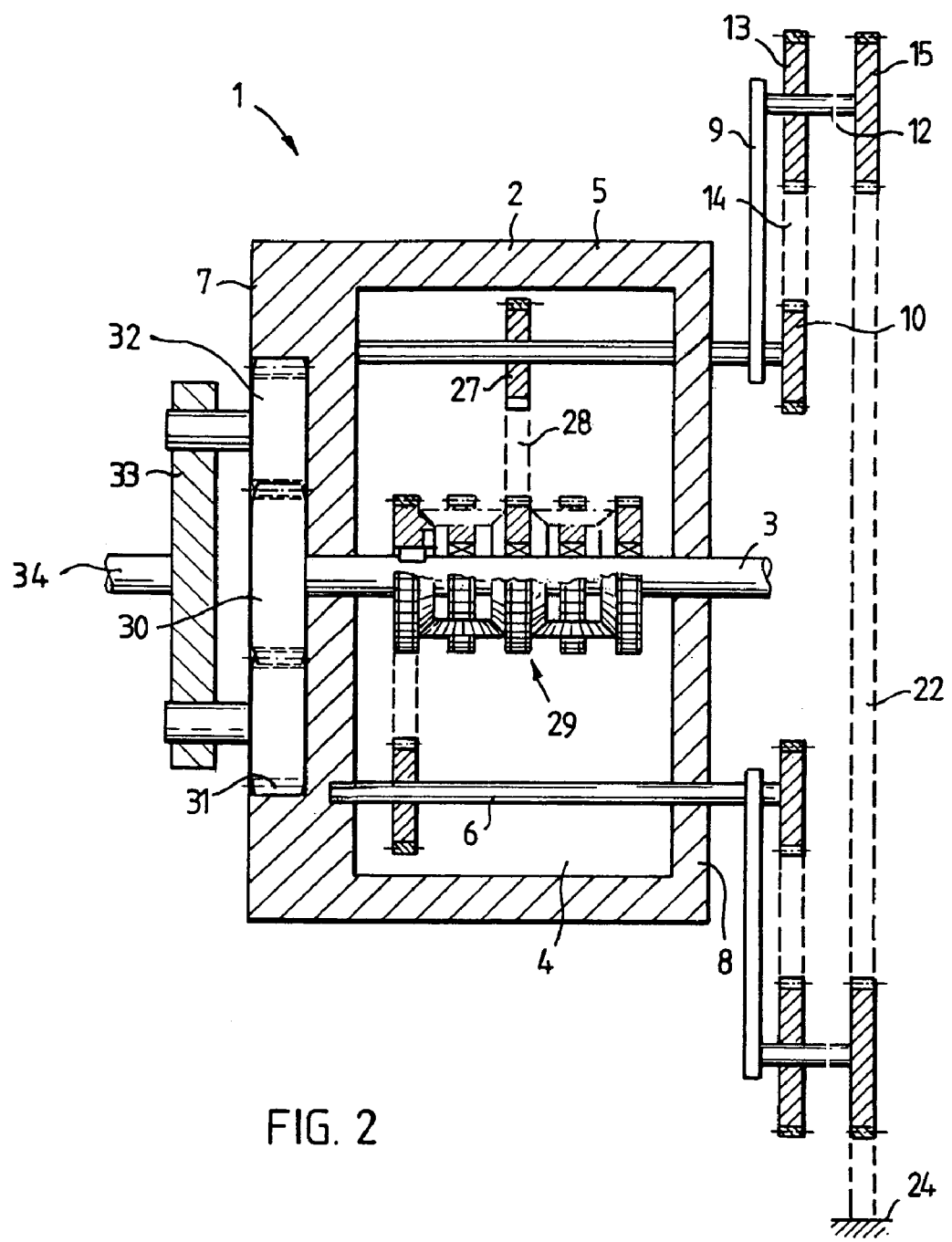
FIG. 2 shows a longitudinal section through the transmission from FIG. 1 coaxial to a central rotating shaft.

The core of the transmission 1 according to the invention is a support body 2, which in the example described above has approximately the form of a hollow cylinder. This cylinder-shaped support body 2 is rotatably mounted on an axle 3 which passes through its inner cavity 4 coaxially to its outer surface 5.

Several equidistant rotating shafts 6 whose axes are aligned parallel to each other pass through the periphery of the cavity 4. These rotating shafts 6 are mounted in the two end sides 7, 8 of the support body 2 and emerge on an end side 8. There they each pass through the inner end 21 of a corresponding swivelling lever 9 and each end in the hub of a gear wheel 10 with which they are connected in a rotationally fixed manner. At the peripheral end 11 of each lever 9 a shaft 12 is mounted for a further gear wheel 13, which is coupled in a rotationally fixed manner to the gear wheel 10 at the inner end of the lever in question 9 by means of a closed chain 14. A further gear wheel 15, which in the following is to be designated as "peripheral gear wheel", is also fixed to each shaft 12.

By the uniform, synchronous swivelling of all levers 9, the rotating shafts 12 can be adjusted from a minimum radial distance to the central axle 3 to a maximum radial distance. At the minimum distance, the levers 9 are adjusted approximately tangentially 16 to the rotating shaft 3, the shafts 12 of the peripheral gears turn in a circle 17 with a small radius r; at the maximum distance, on the other hand, the levers 9 turn approximately radially outwards 18, the shafts 12 move in a large circle 19 with radius R. The adjustment 20 can, for example, be effected by a further gear wheel—not shown—which is also mounted on the rotating shaft 3 and which engages with a toothed area at the rear or radially internal ends 21 of the levers 9, being (slightly) rotatably adjusted vis-á-vis the support body 2. Other mechanisms are conceivable.

The peripheral gears 15 are surrounded on the outside by an open chain 22, which—like the gear wheels 15—may be formed by several identical elements on levels parallel to each other in order to multiply the transmittable forces.

One end 23 of the chain 22 is fixed to the housing or chassis 24 of the transmission 1 according to the invention, the other end 25 of the chain 22 is also connected to the housing or chassis 24, but here a tensioning or spring element 26 is interposed. Depending on the position of the levers 9 between the small and the large circle 17, 19, the tensioning element 26 is in a position to compensate for a change in the required chain length of approximately I=2p (R-r), without the chain tension falling below a lower limit value, so that the engagement between the chain 22 and the peripheral gears 15 is always guaranteed, irrespective of the gear setting 20.

If the support body 2 is rotated around its rotating shaft 3 at a speed of $w_1$, the peripheral gears 15 roll along the chain 22 at a speed of $w_2$, with the speed ratio $w_2/w_1$ depending on the radius set between r and R. This rotary movement is transmitted via the gear wheels 13, the chains 14 and the internal gear wheels 10 to the rotating shafts 6 passing through the cavity 4. Fixed to each rotating shaft 6 within the cavity 4 is a further gear wheel 27, which by means of another chain each 28 is connected to each connection of a differential assembly 29, which is located concentrically on the shaft 3. In the differential assembly 29, the torques of the various rotating shafts are added up and transmitted to the shaft 3.

In the differential assembly 29 the gear wheels in question, as in the illustrated embodiment, may be axially arranged gear wheels coupled to each other by means of gear wheels with radial axes (axial differential), or this may be a radial differential with radially arranged gear wheels, particularly in the form of a modified planetary gear, with the three intercoupled units corresponding to the sun wheel, the planetary gear support and the ring gear of such a planetary gear. The common criterion for this embodiment is the presence of synchronous operation, on the one hand, with 3 intercoupled gear wheels or units rotating at the same speed (provided that no transmission adjustment is taking place), and, on the other hand, the specification of defined conditions with respect to the relative speeds when the transmission according to the invention is being adjusted.

The rotating shaft 3 preferably forms the output shaft of the transmission 1, and for this purpose has been extended outwards through the level of the chain 22. At the other end it may also pass through the opposite end side 7 of the support body 2 and there be fitted with a sun wheel 30 which rotates concentrically within a ring gear 31 which is formed on the outer surface of the end side 7 of the support body 2. Several planetary gear wheels 32, which are mounted on a common planetary gear wheel support 33, rotate within the ring-shaped space between the ring gear 31 and the sun wheel 30. This planetary gear wheel support is in turn connected to a further rotating shaft 34, which can serve as an input or output shaft.

The planetary gear 30-33 is optional, but can preferably supplement the transmission according to the invention 1 to the extent that this would allow synchronous operation to be specified at a desired speed.

Depending on the design of the differential assembly 29, the number of peripheral gears 15 may be even or odd. Both configurations may be advantageous.

All peripheral gears 15 are connected to the differential, from which a connection to rotating shaft 3 is coupled. Then a pair of peripheral gears 15, both of which engage with the chain 22, define the speed of the output shaft 3 and the speed of the gear 15, which does not engage with the chain 22, through the differential, so that there are no undefined speeds and, on the contrary, the remaining gear 15 is rotated exactly so that its teeth engage exactly with the future ends 23, 24 of chain 22.

If transmission 1 is adjusted 20, all peripheral gears 15 rotate at different speeds because the distances between these gears 15 change. This is compensated for by the differentials in the differential assembly 29, while the force distribution remains approximately uniform among all peripheral gears 15 that engage with the chain 22. This means that an adjustment 20 can take place under full load. The chain 22 is guided by means of a roller 35, so that the "aperture" in which at least one gear wheel 15 is not engaged with the chain 22 remains approximately constant, preferably at approx. 360°/n, where n is the number of peripheral gears 15.

Transmission 1 could also be used in a modified form for special applications. For example, if used as an infinitely variable transmission, it would be conceivable in a bicycle to design axle 3 and shaft 34 as one unit and, for example, to couple these with the pedals. This means that the circumferential speed of the peripheral gears 15 around their own axes 12 is blocked, or zero. It changes only during a transmission adjustment operation. It is therefore possible to change the transmission ratio by means of a radial adjustment of the peripheral gears 15, as with a (large) gear whose diameter is varied. The chain, which in this case closes over an output gear wheel on the rear axle of the bicycle, accordingly transmits the circumferential speed, which varies according to the transmission setting, to the rear wheel.

Figure 3:
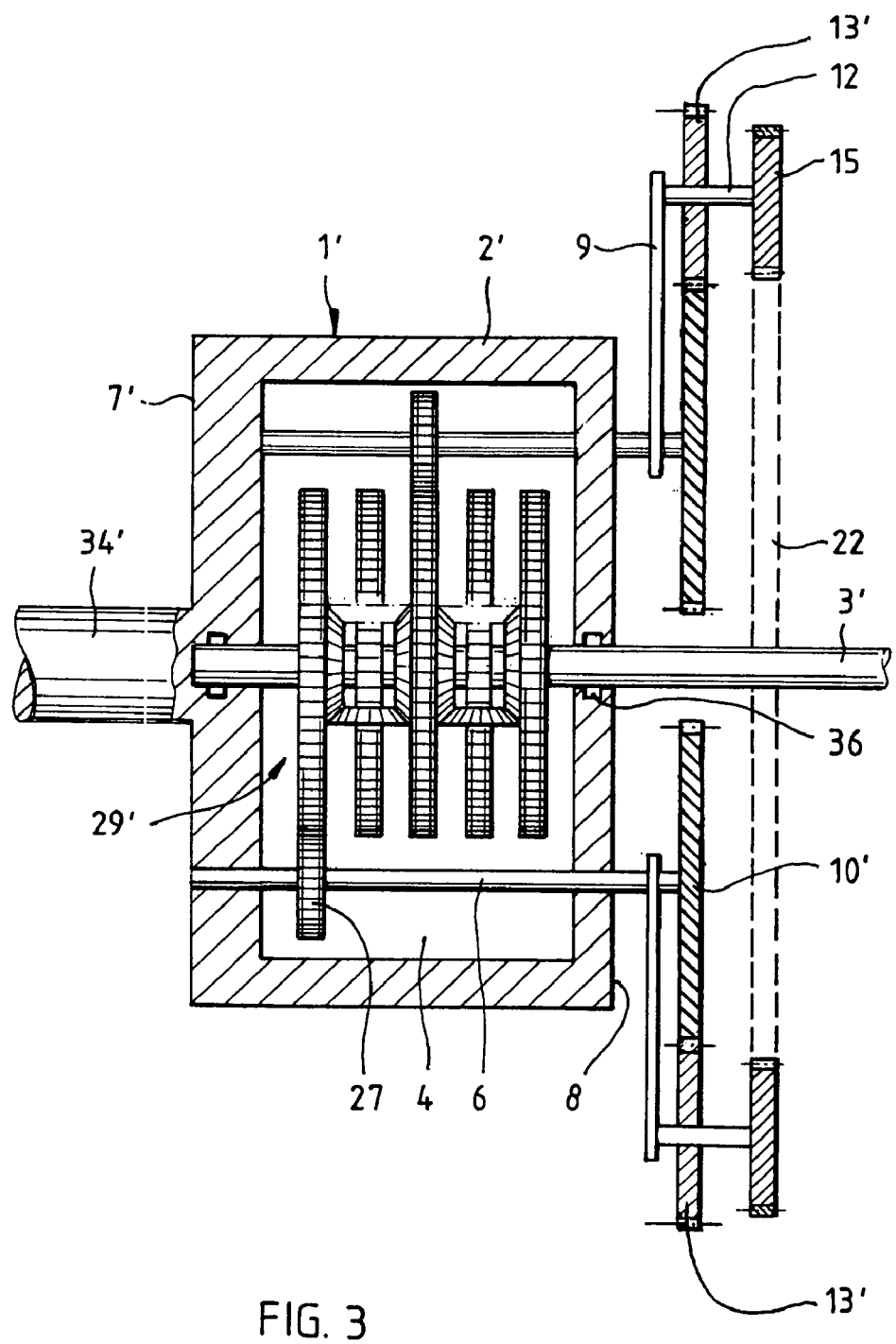
FIG. 3 shows an illustration of a modified embodiment of the invention corresponding to FIG. 2.

In transmission 1' in accordance with FIG. 3, the functions of the driving and driven shafts are reversed for standard applications: the shaft 34' is the driving shaft or input shaft, the shaft 3' is the driven shaft or output shaft. With motor vehicle applications, for example, the shaft 34' could correspond to the engine shaft, the chain 22 could be coupled to a wheel axle. If required, a gearbox, for example, could be installed upstream or downstream of the transmission in such an application, in order to extend the speed adjustment range further.

In other respects, this transmission 1' differs from that described above among other things by the fact that the internal gears 10' and the gears 13' rotatably mounted on the periphery 11 of the swivelling levers 9 are dimensioned in such a way that the relevant gears 10', 13' of a lever 9 engage directly with each other and the chain 14 thus becomes dispensable. Furthermore, the diameter of the inner gear 10' or of the outer gear 13', or both, may be enlarged; the important thing is that one gear 13' and one gear 10' should be constantly meshed. Besides increasing the gear ratio, a reversal of the direction of rotation is also a consequence.

Furthermore, the gears of the differential 29' are so large that they each engage directly with one gear 27 on a rotating shaft 6, so that the chains 28 also become superfluous here. Once more, a change in the gear ratio and a reversal of the direction of rotation are the consequences. Thanks to the double reversal of the direction of rotation, the function of this transmission 1' is exactly like that of transmission 1.

In this embodiment, the planetary gear 30-33 is dispensed with. Instead, the input shaft 34' is directly connected in a rotationally fixed manner and rigidly to the support body 2', on the end side 7' and coaxially to the output shaft 3'. In this case the latter is only coupled in a rotationally fixed manner to the differential 29', in other respects it is rotatably mounted 36 in the support body 2'. The design of this transmission 1' is simpler than that described before, but generates the same effect of an infinitely variable speed adjustment under load and without slip, with a reversal of the direction of rotation between the input and output shafts 34', 3' being implemented if suitable transmission ratio is selected.

In an intermediate position (zero position) the output shaft 3' is at a standstill, while the input shaft 34' is driven. However, the output shaft 3' is not free, but blocked; this makes it possible to start up on a hill without actuating the brake.

The invention claimed is:

1. Infinitely variable transmission (1;1') comprising
  a) a support body (2;2');
  b) a plurality of peripheral gears (15) rotatably mounted on a selected one of said support body (2;2') and mounting elements mechanically coupled to said support body (2;2') in such a way that rotating shafts (12) thereof are oriented parallel to each other, with distances between the rotating shafts (12) of said peripheral gears (15) being adjustable (20) so as to always be located on an outer surface of a hypothetical cylinder;
  c) at least one row of tooth-engaging elements surrounding said peripheral gears (15) on the outside, with which at least several of said peripheral gears (15) engages;
  d) a rotational body (3;3'), substantially coaxial to an axis of rotation of the hypothetical cylinder, and whose rotary movement is coupled to the rotary movement of said peripheral gears (15);
  e) wherein the rotational coupling between said peripheral gears (15) and said rotational body (3;3') is effected by means of at least one compensating transmission to provide an asynchronous rotation of said peripheral gears (15), whereby said peripheral gears (15) are rotatable at different speeds when a distance between said gears (15) changes during synchronous adjustment of a radial distance of the rotating shafts (12) to a central axis of rotation of said rotational body (3;3'), while several of said peripheral gears (15) contribute to power transmission.

2. Infinitely variable transmission in accordance with claim 1, wherein adjustment devices are provided on said support body (2;2') and are adapted to adjust the distance between said peripheral gears (15) or between said peripheral gears and the central axis of the cylinder.

3. Infinitely variable transmission in accordance with claim 2, wherein the said adjustment devices are coupled to each other, such that an adjustment (20) of a distance said peripheral gears (15) is effected uniformly.

4. Infinitely variable transmission in accordance with claim 3, wherein at least one row of said tooth-engaging elements surrounding said peripheral gears (15) on the outside is at least one of flexible and adjustable, so that engagement with at least one of said peripheral gears (15) is effected, regardless of its the current distance setting (16,18) thereof.

5. Infinitely variable transmission in accordance with claim 3, wherein at least one row of said tooth-engaging elements surrounding said peripheral gears (15) on the outside is pretensioned (26) in the direction of said peripheral gears, such that engagement with at least one of said peripheral gears (15) is effected, regardless of the current distance setting (16,18) thereof.

6. Infinitely variable transmission in accordance with claim 3, wherein at least one row of said tooth-engaging elements surrounding said peripheral gears (15) on the outside is formed by a chain (22) whose links engage with the teeth of at least two of said peripheral gears (15).

7. Infinitely variable transmission in accordance with claim 6, wherein the chain (22) engaging with at least one of said peripheral gears (15) is provided with a tensioning element (26), or is coupled to a tensioning element (26), which generates tensile stress between the links of the chain.

8. Infinitely variable transmission in accordance with claim 1, wherein a pivot bearing (36) is located between said support body (2;2') and said rotational body (3;3').

9. Infinitely variable transmission in accordance with claim 1, wherein at least one compensating transmission is located on a central rotating shaft of said rotational body.

10. Infinitely variable transmission in accordance with claim 1, wherein a plurality of the compensating transmissions are arranged one after the other in the direction of the axis of rotation of said rotational body (3;3') and coupled to each other.

11. The infinitely variable transmission (1;1') in accordance with claim 1, in combination with a selected one of passenger cars, trucks, agricultural implements and vehicles, construction engines and vehicles, conveying machines and vehicles, elevators, motorbikes, and bicycles.

12. Method for operating the infinitely variable transmission (1;1') of claim 1, the method comprising the steps of:
   a) engaging at least one of the rows of tooth-engaging elements with the peripheral gears (15) coupled to a selected one of a chassis of a vehicle and a base of a machine;
   b) coupling driving shaft of the infinitely variable transmission (1;1') to one of the support body (7;7') and the rotating shaft (3;3');
   c) coupling a driven shaft of the infinitely variable transmission (1;1') to the other of the support body (7;7') and rotational shaft (3;3'); and
   d) coupling a control element to a distance-adjusting mechanism (20) of the peripheral gears (15) in order to adjust a desired transmission ratio.

* * * * *